(12) United States Patent
Nakazawa et al.

(10) Patent No.: US 9,570,234 B2
(45) Date of Patent: Feb. 14, 2017

(54) MULTILAYER CERAMIC CAPACITOR

(71) Applicant: Murata Manufacturing Co., Ltd., Nagaokakyo-shi, Kyoto-fu (JP)

(72) Inventors: Hirotaka Nakazawa, Nagaokakyo (JP); Takashi Sawada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/872,271

(22) Filed: Oct. 1, 2015

(65) Prior Publication Data

US 2016/0104575 A1  Apr. 14, 2016

(30) Foreign Application Priority Data

Oct. 8, 2014 (JP) .................................. 2014-207123

(51) Int. Cl.
| | |
|---|---|
| *H01G 4/30* | (2006.01) |
| *H01G 4/228* | (2006.01) |
| *H01G 4/12* | (2006.01) |
| *H01G 4/012* | (2006.01) |
| *H01G 4/232* | (2006.01) |

(52) U.S. Cl.
CPC ............... *H01G 4/12* (2013.01); *H01G 4/012* (2013.01); *H01G 4/232* (2013.01); *H01G 4/30* (2013.01)

(58) Field of Classification Search
CPC ........... H01G 4/30; H01G 4/232; H01G 4/228
USPC .......................................... 361/301.4, 306.3
See application file for complete search history.

(56) References Cited

U.S. PATENT DOCUMENTS

| 8,149,565 | B2* | 4/2012 | Lee ................... | H01G 2/065 361/301.1 |
|---|---|---|---|---|
| 2003/0011962 | A1* | 1/2003 | Yamamoto ............... | H01G 4/30 361/321.2 |
| 2011/0205684 | A1* | 8/2011 | Yamamoto ............. | H01G 4/232 361/305 |
| 2012/0319536 | A1* | 12/2012 | Sakuratani ............... | H01G 4/30 310/366 |
| 2012/0319537 | A1* | 12/2012 | Sakuratani ............ | H01L 41/273 310/366 |
| 2012/0320495 | A1* | 12/2012 | Akazawa ................. | H01G 4/30 361/321.2 |
| 2013/0033154 | A1* | 2/2013 | Sakuratani ............... | H01G 4/30 310/366 |
| 2013/0155574 | A1* | 6/2013 | Park ...................... | H01G 4/012 361/321.3 |

(Continued)

FOREIGN PATENT DOCUMENTS

JP  2013-201417 A  10/2013

*Primary Examiner* — Eric Thomas
(74) *Attorney, Agent, or Firm* — Keating & Bennett, LLP

(57) ABSTRACT

In a multilayer ceramic capacitor, SG represents an average of a distance between end portions of inner electrodes in a width direction and side surfaces of a ceramic body, OT represents an average of a distance between inner electrodes closest to main surfaces and the main surfaces, ET1 represents an average of dimensions of each portion of third and fourth terminal electrodes located on the main surfaces, and ET2 represents an average of dimensions of each portion of the third and fourth terminal electrodes located on the side surfaces. A dimension of the ceramic body in the width direction is larger than a dimension of the ceramic body in the height direction and Equations (1) and (2) are satisfied:

$$SG > OT \quad (1)$$

$$ET1 > ET2 \quad (2).$$

16 Claims, 7 Drawing Sheets

(56) References Cited

U.S. PATENT DOCUMENTS

2013/0250476 A1  9/2013  Chung et al.

* cited by examiner

MULTILAYER CERAMIC CAPACITOR

BACKGROUND OF THE INVENTION

1. Field of the Invention

The present invention relates to a multilayer ceramic capacitor.

2. Description of the Related Art

As disclosed in Japanese Unexamined Patent Application Publication No. 2013-201417 for example, in the related art, multilayer ceramic capacitors are known in which terminal electrodes are provided on first and second end surfaces and first and second side surfaces of a ceramic body.

It is required that multilayer ceramic capacitors have high moisture resistance reliability.

SUMMARY OF THE INVENTION

Preferred embodiments of the present invention provide a multilayer ceramic capacitor having excellent moisture resistance reliability.

A multilayer ceramic capacitor according to a first preferred embodiment of the present invention includes a ceramic body, a first inner electrode, a second inner electrode, a first terminal electrode, a second terminal electrode, a third terminal electrode and a fourth terminal electrode. The first and second main surfaces extend in a length direction and a width direction. The first and second side surfaces extend in the length direction and a height direction. The first and second end surfaces extend in the width direction and the height direction. A dimension of the ceramic body in the width direction is larger than a dimension of the ceramic body in the height direction. The first inner electrode is provided inside the ceramic body and extends out to the first and second end surfaces. The second inner electrode is provided inside the ceramic body and extends out to the first and second side surfaces. The first terminal electrode is provided on a portion of the first side surface and extends from the first side surface onto a portion of each of the first and second main surfaces. The second terminal electrode is provided on a portion of the second side surface and extends from the second side surface onto a portion of each of the first and second main surfaces. The third terminal electrode is provided on the first end surface and extends from the first end surface onto a portion of each of the first and second main surfaces and a portion of each of the first and second side surfaces. The fourth terminal electrode is provided on the second end surface and extends from the second end surface onto a portion of each of the first and second main surfaces and a portion of each of the first and second side surfaces. SG represents an average of a distance between end portions of the inner electrodes in the width direction and the side surfaces of the ceramic body. OT represents an average of a distance between inner electrodes that are closest to the main surfaces, and the main surfaces. ET1 represents an average of dimensions of each portion of the third and fourth terminal electrodes located on the main surfaces. ET2 represents an average of each portion of the third and fourth terminal electrodes located on the side surfaces. The multilayer ceramic capacitor according to the first preferred embodiment of the present invention satisfies the following Equation (1) and Equation (2).

$$SG > OT \quad (1)$$

$$ET1 > ET2 \quad (2)$$

A multilayer ceramic capacitor according to a second preferred embodiment of the present invention includes a ceramic body, a first inner electrode, a second inner electrode, a first terminal electrode, a second terminal electrode, a third terminal electrode and a fourth terminal electrode. The first and second main surfaces extend in a length direction and a width direction. The first and second side surfaces extend in the length direction and a height direction. The first and second end surfaces extend in the width direction and the height direction. A dimension of the ceramic body in the width direction is larger than a dimension of the ceramic body in the height direction. The first inner electrode is provided inside the ceramic body and extends out to the first and second end surfaces. The second inner electrode is provided inside the ceramic body and extends out to the first and second side surfaces. The first terminal electrode is provided on a portion of the first side surface and extends from the first side surface onto a portion of each of the first and second main surfaces. The second terminal electrode is provided on a portion of the second side surface and extends from the second side surface onto a portion of each of the first and second main surfaces. The third terminal electrode is provided on the first end surface and extends from the first end surface onto a portion of each of the first and second main surfaces and a portion of each of the first and second side surfaces. The fourth terminal electrode is provided on the second end surface and extends from the second end surface onto a portion of each of the first and second main surfaces and a portion of each of the first and second side surfaces. SG represents an average of a distance from the first side surface to one of the first and second inner electrodes in the width direction and a distance from the second side surface to one of the first and second inner electrodes in the width direction. OT represents an average of a distance from the first main surface to an inner electrode closest to the first main surface among the first and second inner electrodes and a distance from the second main surface to an inner electrode closest to the second main surface among the first and second inner electrodes. ET1 represents an average of dimensions in the height direction of each portion of the third and fourth terminal electrodes located on the main surfaces. ET2 represents an average of dimensions in the height direction of each portion of the third and fourth terminal electrodes located on the side surfaces. The multilayer ceramic capacitor according to the second preferred embodiment of the present invention satisfies the following Equation (3) and Equation (4).

$$SG < OT \quad (3)$$

$$ET1 < ET2 \quad (4)$$

According to preferred embodiments of the present invention, a multilayer ceramic capacitor having excellent moisture resistance reliability is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereafter, examples of preferred embodiments of the present invention will be described. However the following preferred embodiments are merely illustrative examples. The present invention is in no way limited to the following preferred embodiments.

In addition, in the drawings referred to in the description of preferred embodiments and so forth, members having the same or substantially the same functions are referred to using the same symbols. In addition, the drawings referred to in the description of preferred embodiments and so forth are schematic drawings. The dimensional ratios and so forth of bodies drawn in the drawings may differ from the dimensional ratios and so forth of the actual bodies. The dimensional ratios and so forth of bodies may also differ from drawing to drawing. The specific dimensional ratios and so forth of bodies should be determined by referring to the following description.

A ceramic electronic component according to a preferred embodiment of the present invention may be a ceramic capacitor, a piezoelectric component, a thermistor, an inductor, or the like. Hereafter, an example in which the ceramic electronic component according to the present preferred embodiment is a ceramic capacitor will be described.

Figure 1:
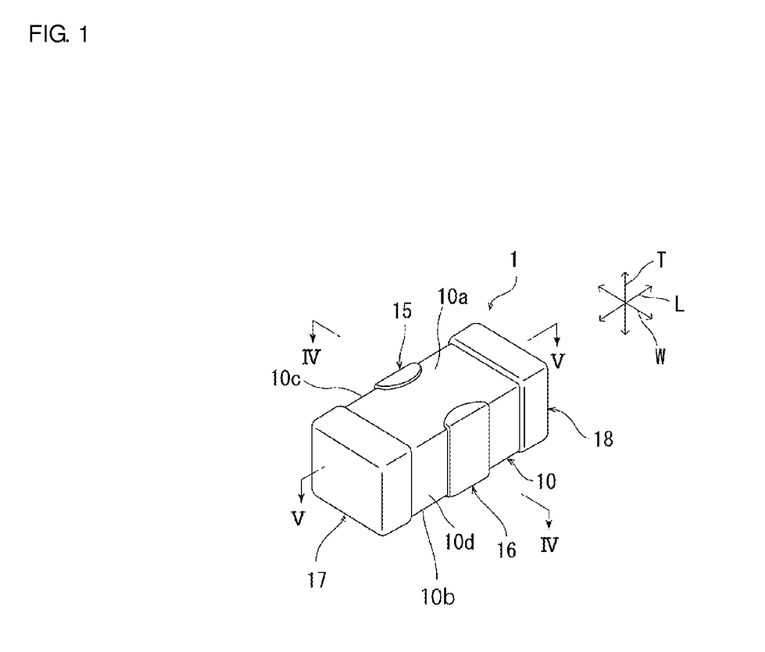
FIG. 1 is a schematic perspective view of a multilayer ceramic capacitor according to a preferred embodiment of the present invention.
Figure 2:
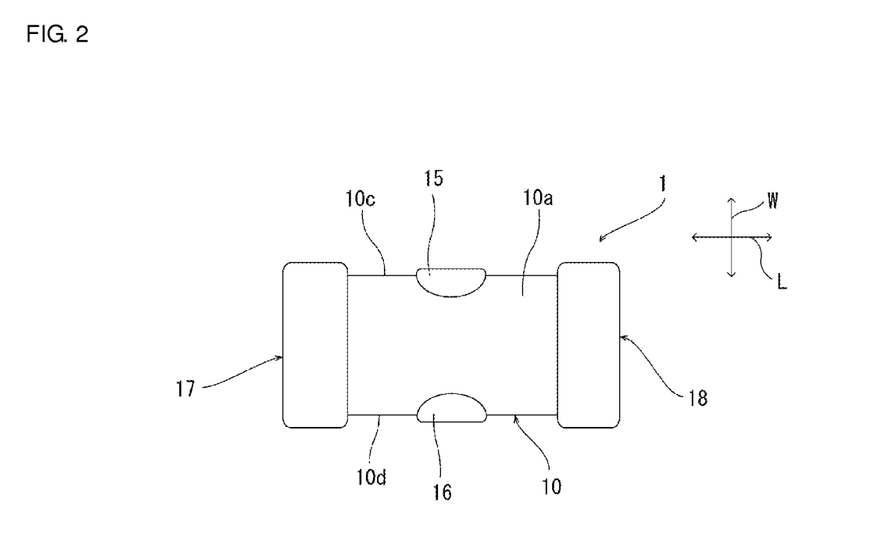
FIG. 2 is a schematic plan view of the multilayer ceramic capacitor according to a preferred embodiment of the present invention.
Figure 3:
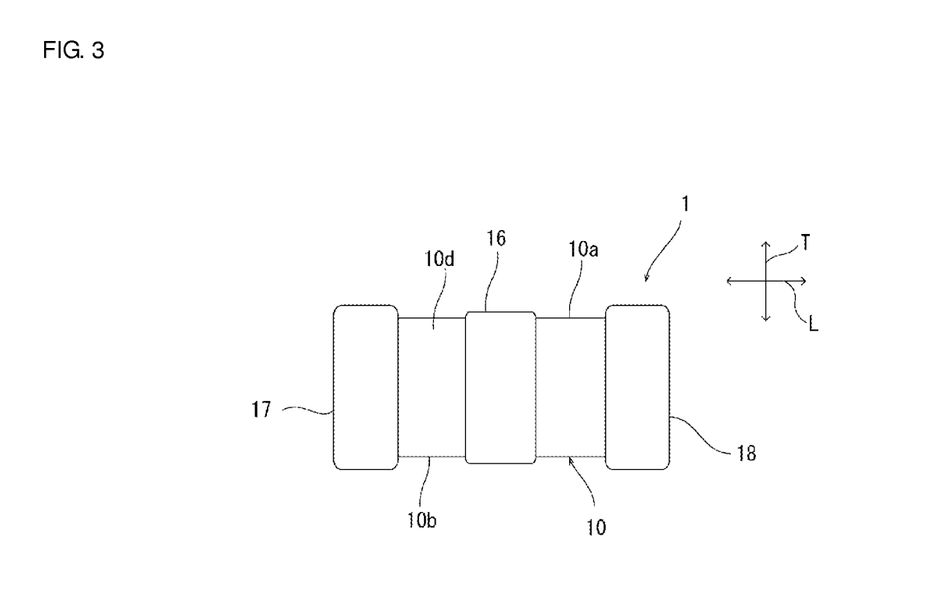
FIG. 3 is a schematic side view of the multilayer ceramic capacitor according to a preferred embodiment of the present invention.
Figure 4:
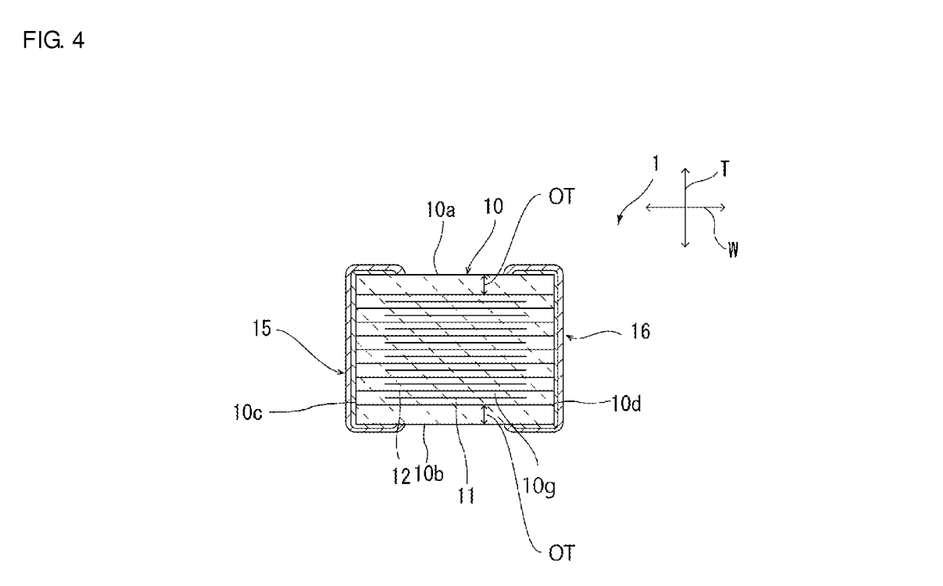
FIG. 4 is a schematic sectional view taken along line IV-IV of FIG. 1.
Figure 5:
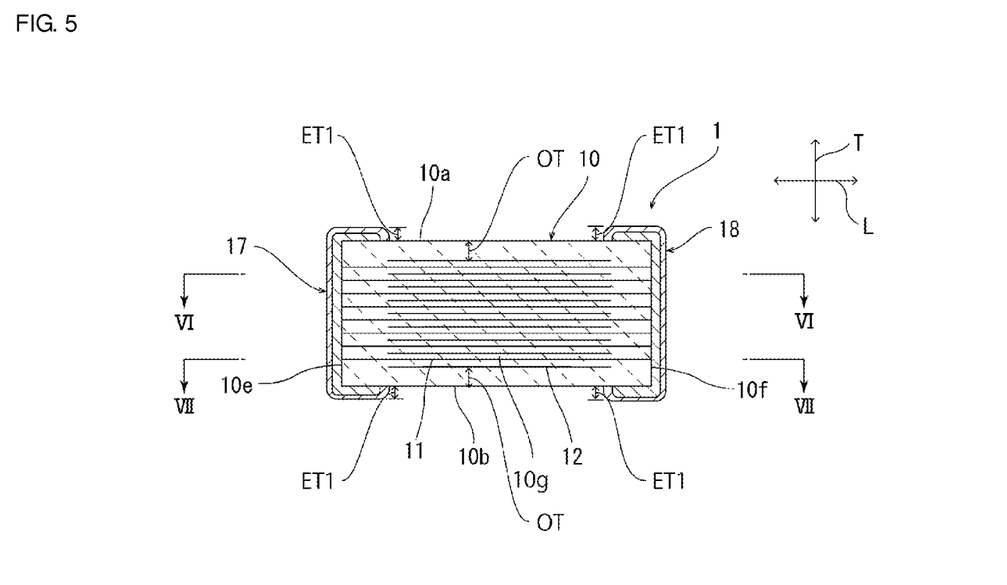
FIG. 5 is a schematic sectional view taken along line V-V of FIG. 1.
Figure 6:
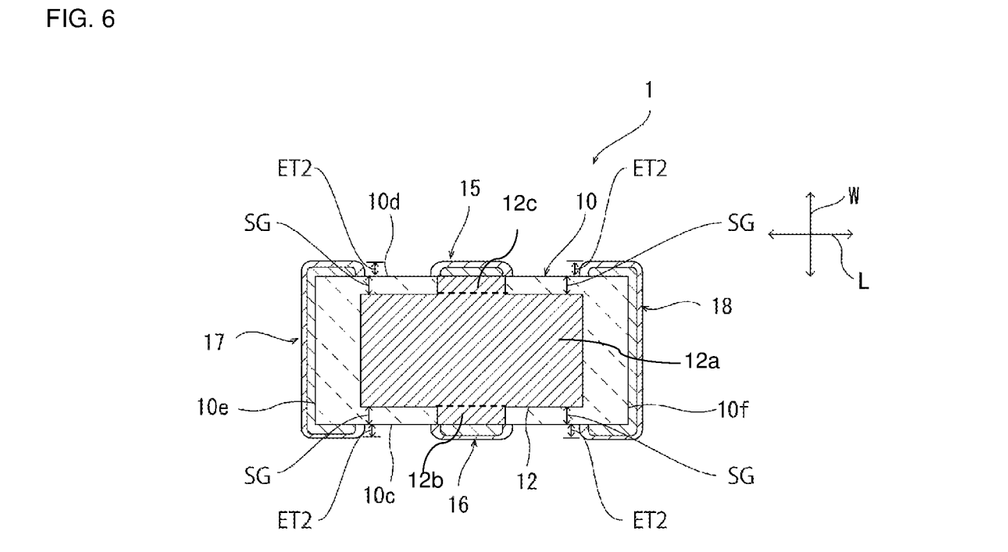
FIG. 6 is a schematic sectional view taken along line VI-VI of FIG. 5.
Figure 7:
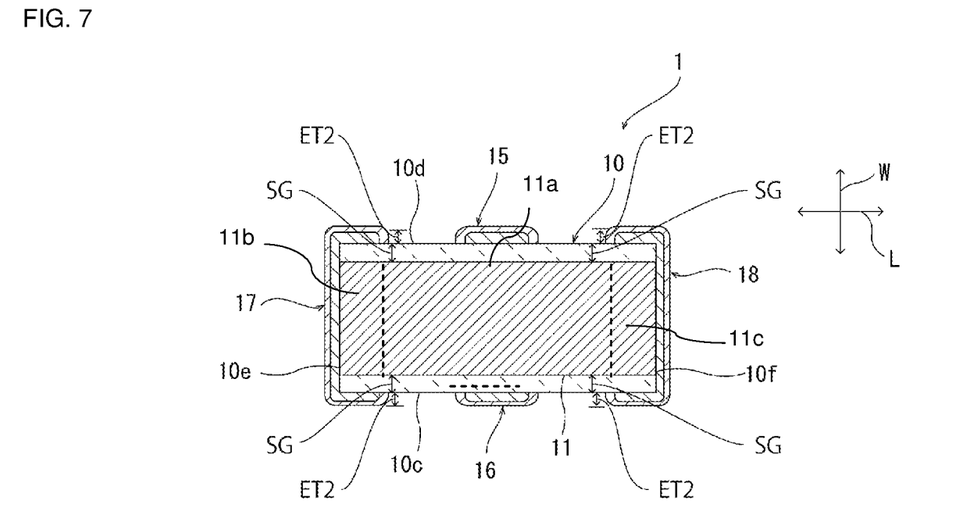
FIG. 7 is a schematic sectional view taken along line VII-VII of FIG. 5.

FIG. 1 is a schematic perspective view of a multilayer ceramic capacitor according to this preferred embodiment. FIG. 2 is a schematic plan view of the multilayer ceramic capacitor according to this preferred embodiment. FIG. 3 is a schematic side view of the multilayer ceramic capacitor according to this preferred embodiment. FIG. 4 is a schematic sectional view taken along line IV-IV of FIG. 1. FIG. 5 is a schematic sectional view taken along line V-V of FIG. 1. FIG. 6 is a schematic sectional view taken along line VI-VI of FIG. 5. FIG. 7 is a schematic sectional view taken along line VII-VII of FIG. 5.

As illustrated in FIGS. 1 to 3, the multilayer ceramic capacitor 1 includes a ceramic body 10. The ceramic body 10 preferably has a rectangular or substantially rectangular parallelepiped shape. Corner portions and edge portions of the ceramic body 10 may be rounded. In addition, irregularities may be provided on surfaces of the ceramic body 10.

The ceramic body 10 includes first and second main surfaces 10a and 10b, first and second side surfaces 10c and 10d, and first and second end surfaces 10e and 10f.

The first and second main surfaces 10a and 10b each extend in a length direction L and a width direction W. The length direction L is orthogonal to the width direction W. The first main surface 10a and the second main surface 10b oppose each other in a height direction T. The height direction T is orthogonal to the length direction L and the width direction W. A dimension of each of the first and second main surfaces 10a and 10b in the width direction W is shorter than a dimension of each of the first and second main surfaces 10a and 10b in the length direction L. It is preferable that the dimension of each of the first and second main surfaces 10a and 10b in the width direction W be about 0.60 to about 0.70 times and more preferably be about 0.63 to about 0.67 times the dimension of each of the first and second main surfaces 10a and 10b in the length direction L, for example.

The first and second side surfaces 10c and 10d each extend in the length direction L and the height direction T. The first side surface 10c and the second side surface 10d oppose each other in the width direction W.

The first and second end surfaces 10e and 10f each extend in the width direction W and the height direction T. The first end surface 10e and the second end surface 10f oppose each other in the length direction L.

The ceramic body 10 may be formed of a dielectric ceramic for example. Specific examples of a dielectric ceramic include $BaTiO_3$, $CaTiO_3$, $SrTiO_3$ and $CaZrO_3$. For example, a Mn compound, an Mg compound, an Si compound, an Fe compound, a Cr compound, a Co compound, an Ni compound or a rare earth compound may be added to the ceramic body 10.

As illustrated in FIGS. 4 to 7, first inner electrodes and second inner electrodes 12 are provided inside the ceramic body 10. The first and second inner electrodes 11 and 12 may be formed of a metal such as Ni, Cu, Ag, Pd, Au or a Ag—Pd alloy.

As illustrated in FIGS. 4 to 7, the first inner electrodes 11 each include a main portion 11a and led out portions 11b and 11c, and the second inner electrodes 12 each include a main portion 12a and led out portions 12b and 12c. The main portions 11a of the first inner electrodes 11 and the main portions 12a of the second inner electrodes 12 oppose each other in the height direction T with ceramic portions 10g interposed therebetween.

As illustrated in FIG. 4 and FIG. 6, the second inner electrodes 12 each extend out to the first side surface 10c via the led out portion 12b and extend out to the second side surface 10d via the led out portion 12c. The led out portions 12b are exposed at the first side surface 10c. The led out portions 12c are exposed at the second side surface 10d. The second inner electrodes 12 do not extend out to the first end surface 10e and the second end surface 10f and are separated from the first end surface 10e and the second end surface 10f.

As illustrated in FIG. 5 and FIG. 7, the first inner electrodes 11 each extend out to the first end surface 10e via the led out portion 11b and extend out to the second end surface 10f via the led out portion 11c. The led out portions 11b are exposed at the first end surface 10e. The led out portions 11c are exposed at the second end surface 10f. The first inner electrodes 11 do not extend out to the first side surface 10c and the second side surface 10d and are spaced apart from the first side surface 10c and the second side surface 10d.

As illustrated in FIGS. 1 and 2, a first terminal electrode 15 is provided on a portion of the first side surface 10c. In this preferred embodiment, the first terminal electrode 15 defines a first signal terminal electrode.

Specifically, the first terminal electrode 15 is provided in a central portion of the first side surface 10c in the length direction L. As illustrated in FIG. 4, the first terminal electrode 15 extends from the first side surface 10c onto a portion of both the first and second main surfaces 10a and 10b.

As illustrated in FIGS. 1 to 3, a second terminal electrode 16 is provided on a portion of the second side surface 10d. In this preferred embodiment, the second terminal electrode 16 defines a second signal terminal electrode.

Specifically, the second terminal electrode 16 is provided in a central portion of the second side surface 10d in the length direction L. As illustrated in FIG. 4, the second terminal electrode 16 extends from the second side surface 10d onto part of both the first and second main surfaces 10a and 10b.

As illustrated in FIGS. 5 to 7, a third terminal electrode 17 is provided on the first end surface 10e. In this preferred embodiment, the third terminal electrode 17 defines a first grounding terminal electrode.

The third terminal electrode 17 extends from the first end surface 10e onto a portion of both the first and second main surfaces 10a and 10b and onto a portion of both the first and second side surfaces 10c and 10d.

As illustrated in FIGS. 5 to 7, a fourth terminal electrode 18 is provided on the second end surface 10f. In this preferred embodiment, the fourth terminal electrode 18 defines a second grounding terminal electrode.

The fourth terminal electrode 18 extends from the second end surface 10f onto a portion of both the first and second main surfaces 10a and 10b and onto a portion of both the first and second side surfaces 10c and 10d.

The terminal electrodes 15 to 18 may be formed of a suitable conductive agent such as Ni, Cu, Ag, Pd, Au or a Ag—Pd alloy. Each of the terminal electrodes 15 to 18 may be formed of a fired electrode layer containing glass and a conductive agent and a plurality of conductive layers composed of plating layers formed on top of the fired electrode layer.

In this preferred embodiment, an example is described in which the first and second terminal electrodes 15 and 16 define signal terminal electrodes and the third and fourth terminal electrodes 17 and 18 define grounding terminal electrodes, but the present invention is not limited to this configuration. For example, the first and second terminal electrodes 15 and 16 may define grounding terminal electrodes and the third and fourth terminal electrodes 17 and 18 may define signal terminal electrodes.

The thicknesses of the terminal electrodes 15 to 18 can be measured by observing an area with vertical and horizontal dimensions of 30 μm of a cross-section of the ceramic body using a scanning electron microscope, for example. The cross-section of the ceramic body is, for example, obtained by subjecting a main surface, a side surface or an end surface of the ceramic body to grinding until the volume of the ceramic body becomes approximately half the original volume.

A method of manufacturing the multilayer ceramic capacitor 1 is not particularly limited. The multilayer ceramic capacitor 1 may be manufactured using the following procedure, for example.

First, ceramic green sheets containing a ceramic powder are prepared. The ceramic green sheets can be manufactured by for example applying a ceramic paste containing a ceramic powder and so forth.

Next, conductive paste layers for forming the first and second inner electrodes 11 and 12 are formed by applying a conductive paste onto the ceramic green sheets. Application of the conductive paste may be performed by using any of various printing methods such as a screen printing method, for example.

Next, the ceramic green sheets to which conductive paste layers have not been applied and the ceramic green sheets to which conductive paste layers have been applied are appropriately stacked on top of one another and subjected to pressing, and thus a mother multilayer body is manufactured.

Next, the mother multilayer body is cut along imaginary cutting lines and thus a plurality of green ceramic multilayer bodies are manufactured from the mother multilayer body. Cutting of the mother multilayer body may be carried out by performing cutting with a dicing machine or by performing pressing and cutting.

After manufacture of the green ceramic multilayer bodies, edge portions and chamfers of edge portions and surfaces layers of the green ceramic bodies may be ground by barrel grinding or the like.

Next, the green ceramic multilayer bodies are fired. The firing temperature can be appropriately set in accordance with the types of ceramic material and conductive paste used.

Next, the terminal electrodes 15 to 18 are formed. The terminal electrodes 15 and 16 can be formed by pressing a roller charged with a conductive paste against the first and second side surfaces 10c and 10d of the ceramic multilayer body to apply the conductive paste so that the conductive paste extends from the first and second side surfaces 10c and 10d of the ceramic multilayer body onto the first and second main surfaces 10a and 10b, and then performing baking. After that, plating is performed. In addition, the terminal electrodes 17 and 18 can be formed by dipping the first and second end surfaces 10e and 10f of the ceramic multilayer body into a conductive paste bath to apply the conductive paste so that the conductive paste extends from the first and second end surfaces 10e and 10f of the ceramic multilayer body onto the first and second main surfaces 10a and 10b and then performing baking. After that, plating is performed.

Here, SG represents an average of a distance between end portions of the first and second inner electrodes 11 and 12 in the width direction W and the side surfaces 10c and 10d of the ceramic body 10. In other words, SG represents an average of a distance in the width direction W from the side surface 10c to one of the first and second inner electrode 11 and 12 and a distance in the width direction W from the side surface 10d to one of the first and second inner electrode 11 and 12. OT represents an average of a distance between the inner electrodes closest to the main surfaces 10a and 10b among the first and second inner electrodes 11 and 12, and the main surfaces 10a and 10b. In other words, OT represents an average of a distance in the height direction T from the main surface 10a to an inner electrode closest to the main surface 10a among the first and second inner electrodes 11 and 12 and a distance in the height direction T from the main surface 10b to an inner electrode closest to the main surface 10b among the first and second inner electrodes 11 and 12. ET1 represents an average of dimensions in the height direction of each portion of the third and fourth terminal electrodes 17 and 18 located on the main surfaces 10a and 10b. ET2 represents an average of dimensions in the height direction of each portion of the third and fourth terminal electrodes 17 and 18 located on the side surfaces 10c and 10d. Here, end portions of the first and second inner electrodes 11 and 12 in the width direction W refers to portions of the main portions 11a and 12a of the first and second inner electrodes 11 and 12 closest to the side surfaces 10c and 10d.

In the multilayer ceramic capacitor 1, a dimension of the ceramic body 10 in the width direction is larger than a dimension of the ceramic body 10 in the height direction and the below Equation (1) and Equation (2) are satisfied. Therefore, the multilayer ceramic capacitor 1 has excellent moisture resistance reliability.

$$SG > OT \tag{1}$$

$$ET1 > ET2 \tag{2}$$

The reason for this is that when the dimension of the ceramic body 10 in the width direction is larger than the dimension of the ceramic body 10 in the height direction, portions of the terminal electrodes 17 and 18 on the relatively long edge portions of the ceramic body 10 extending in the width direction are liable to become especially thin. When Equation (2) is satisfied, the thicknesses of the terminal electrodes 17 and 18 on the edge portions of the ceramic body 10 extending in the width direction can be made large. Therefore, intrusion of moisture from edge portions of the ceramic body 10 extending in the width direction into the inside of the ceramic body 10 is significantly reduced or prevented. Therefore, excellent moisture resistance reliability is achieved.

From the viewpoint of realizing even more excellent moisture resistance reliability, it is further preferable that ET1 be about 1.5 times or more and about 2.2 times or less ET2, for example.

In addition, from the viewpoint of realizing even more excellent moisture resistance reliability, it is preferable that SG be about 1.3 times or more and about 2.5 times or less OT, for example.

A multilayer ceramic capacitor that satisfies the above Equations (1) and (2) can be manufactured by controlling the areas of the conductive paste layers that will become the first and second inner electrodes 11 and 12 formed on the ceramic green sheets and by controlling the viscosity of the conductive paste, the dipping speed and so forth when dipping the ceramic multilayer body into the conductive paste that will form the terminal electrodes 17 and 18.

Measurement of ET1 is performed using five multilayer ceramic capacitors, for example. In each of the multilayer ceramic capacitors, a side surface of the ceramic body 10 is ground down to a position halfway through the ceramic body 10 in the width direction, and thus a cross-section in which portions of the third and fourth terminal electrodes 17 and 18 located on the main surfaces 10a and 10b are visible is exposed. An area of this cross-section with vertical and horizontal dimensions of 30 μm is observed using a scanning electron microscope. The maximum thickness of a portion of the third terminal electrode 17 located on the main surface 10a, the maximum thickness of a portion of the third terminal electrode 17 located on the main surface 10b, the maximum thickness of a portion of the fourth terminal electrode 18 located on the main surface 10a, and the maximum thickness of a portion of the fourth terminal electrode 18 located on the main surface 10b are measured and an average of these values is obtained. Regarding the number of times measurement is performed, for example, five multilayer ceramic capacitors are used and measurement is performed on each of the multilayer ceramic capacitors, and measurement of ET2 is performed using five multilayer ceramic capacitors, for example. In each of the multilayer ceramic capacitors, a main surface of the ceramic body 10 is ground down to a position halfway through the ceramic body 10 in the height direction, and thus a cross-section in which portions of the third and fourth terminal electrodes 17 and 18 located on the side surfaces 10c and 10d are visible is exposed. An area of this cross-section with vertical and horizontal dimensions of 30 μm is observed using a scanning electron microscope. The maximum thickness of a portion of the third terminal electrode 17 located on the side surface 10c, the maximum thickness of a portion of the third terminal electrode 17 located on the side surface 10d, the maximum thickness of a portion of the fourth terminal electrode 18 located on the side surface 10c, and the maximum thickness of a portion of the fourth terminal electrode 18 located on the side surface 10d are measured and an average of these values is obtained.

Measurement of SG and OT is, for example, performed using five multilayer ceramic capacitors. A cross-section in which the first and second inner electrodes 11 and 12 are visible is exposed by grinding down an end surface of the ceramic body 10 of each multilayer ceramic capacitor to a position halfway through the ceramic body 10 in the length direction. An area of this cross-section with vertical and horizontal dimensions of 30 μm is observed using a scanning electron microscope. Then, a minimum distance from the main portions 11a and 12a of the first and second inner electrodes 11 and 12 to the side surface 10c and a minimum distance from the main portions 11a and 12a of the first and second inner electrodes 11 and 12 to the side surface 10d are measured and an average of these values is obtained. In addition, a minimum distance from an upper side of the uppermost inner electrode to the first main surface 10a and a minimum distance from a lower side of the lowermost inner electrode to the second main surface 10b are measured and an average of these values is obtained.

In this way, it can be confirmed that the above Equations (1) and (2) are satisfied.

For the same reason, an excellent moisture resistance reliability is achieved when the below Equations (3) and (4) are satisfied for the case where the dimension of the ceramic body 10 in the width direction is smaller than the dimension of the ceramic body 10 in the height direction.

$$SG<OT \qquad (3)$$

$$ET1<ET2 \qquad (4)$$

From the viewpoint of realizing even more excellent moisture resistance reliability, it is further preferable that ET2 be about 1.5 times or more and about 2.2 times or less ET1, for example.

In addition, from the viewpoint of achieving even more excellent moisture resistance reliability, it is preferable that OT be about 1.3 times or more and about 2.5 times or less SG, for example.

EXPERIMENTAL EXAMPLES

Thirty-six samples of the multilayer ceramic capacitor were manufactured using the manufacturing method described in the above preferred embodiment under substantially the same conditions except for the parameters detailed in Table 1. Next, each sample was subjected to a moisture resistance reliability test. Specifically, a voltage of 4 V was applied for 500 hours in an environment of 85° C. and 85% RH. The obtained results are illustrated in Table 1. The multilayer ceramic capacitors had a length of 1.04 mm, a width of 0.670 mm and a thickness of 0.450 mm. The capacitance of the multilayer ceramic capacitors was 4.3 μF. The rated voltage was 4 V.

In this experimental example, when measuring SG, a minimum distance from the main portions of the first inner electrodes to the first side surface and a minimum distance from the main portions of the first inner electrodes to the second side surface were measured in a cross-section obtained by grinding down an end surface of the ceramic body up to a position halfway through the ceramic body in the length direction and an average of these values was obtained. This is because the main portion and the led out portion of the second inner electrode are connected to each other in the cross-section obtained by grinding.

The moisture resistance reliability was rated "not defective" when the insulation resistance was 1×10⁶Ω or more and was rated "defective" when the insulation resistance was less than 1×10⁶Ω.

TABLE 1

|  | Experimental Example 1 | Experimental Example 2 | Experimental Example 3 |
|---|---|---|---|
| ET1 (μm) | 13.2 | 13.2 | 9.5 |
| ET2 (μm) | 9.5 | 9.5 | 13.2 |
| OT (μm) | 25 | 50 | 25 |
| SG (μm) | 50 | 25 | 50 |
| Number of samples having not defective moisture resistance reliability/number of samples | 0/36 | 3/36 | 3/36 |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body including first and second main surfaces that extend in a length direction and a width direction, first and second side surfaces that extend in the length direction and a height direction, and first and second end surfaces that extend in the width direction and the height direction, a dimension of the ceramic body in the width direction being larger than a dimension of the ceramic body in the height direction;
a first inner electrode provided inside the ceramic body and extending out to the first and second end surfaces;
a second inner electrode provided inside the ceramic body and extending out to the first and second side surfaces;
a first terminal electrode provided on a portion of the first side surface and extending from the first side surface onto a portion of each of the first and second main surfaces;
a second terminal electrode provided on a portion of the second side surface and extending from the second side surface onto a portion of each of the first and second main surfaces;
a third terminal electrode provided on the first end surface and extending from the first end surface onto a portion of each of the first and second main surfaces and a portion of each of the first and second side surfaces; and
a fourth terminal electrode provided on the second end surface and extending from the second end surface onto a portion of each of the first and second main surfaces and a portion of each of the first and second side surfaces; wherein
SG represents an average of a distance from the first side surface to one of the first and second inner electrodes in the width direction and a distance from the second side surface to one of the first and second inner electrodes in the width direction;
OT represents an average of a distance from the first main surface to an inner electrode closest to the first main surface among the first and second inner electrodes and a distance from the second main surface to an inner electrode closest to the second main surface among the first and second inner electrodes;
ET1 represents an average of dimensions of each portion of the third and fourth terminal electrodes located on the first and second main surfaces in the height direction;
ET2 represents an average of dimensions of each portion of the third and fourth terminal electrodes located on the first and second side surfaces in the height direction; and
Equation (1) and Equation (2) are satisfied:

$$SG > OT \quad (1)$$

$$ET1 > ET2 \quad (2).$$

2. The ceramic electronic component according to claim 1, wherein ET1 is about 1.5 times or more and about 2.2 times or less ET2.

3. The ceramic electronic component according to claim 1, wherein SG is about 1.3 times or more and about 2.5 times or less OT.

4. The ceramic electronic component according to claim 1, wherein the ceramic electronic component is one of a capacitor, a piezoelectric component, a thermistor, and an inductor.

5. The ceramic electronic component according to claim 1, wherein a dimension of each of the first and second main surfaces in the width direction is about 0.60 to about 0.70 times a dimension of each of the first and second main surfaces in the length direction.

6. The ceramic electronic component according to claim 1, wherein a dimension of each of the first and second main surfaces in the width direction is about 0.63 to about 0.67 times a dimension of each of the first and second main surfaces in the length direction.

7. The ceramic electronic component according to claim 1, wherein at least one of the first, second, third and fourth terminal electrodes include a fired electrode layer and plating layers on top of the fired electrode layer.

8. The ceramic electronic component according to claim 1, wherein the first and second terminal electrodes are signal terminal electrodes and the third and fourth terminal electrodes are grounding terminal electrodes.

9. A ceramic electronic component comprising:
a ceramic body including first and second main surfaces that extend in a length direction and a width direction, first and second side surfaces that extend in the length direction and a height direction, and first and second end surfaces that extend in the width direction and the height direction, a dimension of the ceramic body in the width direction being smaller than a dimension of the ceramic body in the height direction;
a first inner electrode provided inside the ceramic body and extending out to the first and second end surfaces;
a second inner electrode provided inside the ceramic body and extending out to the first and second side surfaces;
a first terminal electrode provided on a portion of the first side surface and extending from the first side surface onto a portion of each of the first and second main surfaces;
a second terminal electrode provided on a portion of the second side surface and extending from the second side surface onto a portion of each of the first and second main surfaces;
a third terminal electrode provided on the first end surface and extending from the first end surface onto a portion of each of the first and second main surfaces and the first and second side surfaces; and a fourth terminal electrode provided on the second end surface and extending from the second end surface onto a portion of each of the first and second main surfaces and the first and second side surfaces; wherein SG represents an average of a distance from the first side surface to one of the first and second inner electrodes in the width direction and a distance from the second side surface to one of the first and second inner electrodes in the width direction;

OT represents an average of a distance from the first main surface to an inner electrode closest to the first main surface among the first and second inner electrodes and a distance from the second main surface to an inner electrode closest to the second main surface among the first and second inner electrodes;

ET1 represents an average of dimensions of each portion of the third and fourth terminal electrodes located on the first and second main surfaces in the height direction;

ET2 represents an average of dimensions of each portion of the third and fourth terminal electrodes located on the first and second side surfaces in the height direction; and Equation (3) and Equation (4) are satisfied:

$$SG < OT \tag{3}$$

$$ET1 < ET2 \tag{4}.$$

10. The ceramic electronic component according to claim 9, wherein ET2 is about 1.5 times or more and about 2.2 times or less ET1.

11. The ceramic electronic component according to claim 9, wherein OT is about 1.3 times or more and about 2.5 times or less SG.

12. The ceramic electronic component according to claim 9, wherein the ceramic electronic component is one of a capacitor, a piezoelectric component, a thermistor, and an inductor.

13. The ceramic electronic component according to claim 9, wherein a dimension of each of the first and second main surfaces in the width direction is about 0.60 to about 0.70 times a dimension of each of the first and second main surfaces in the length direction.

14. The ceramic electronic component according to claim 9, wherein a dimension of each of the first and second main surfaces in the width direction is about 0.63 to about 0.67 times a dimension of each of the first and second main surfaces in the length direction.

15. The ceramic electronic component according to claim 9, wherein at least one of the first, second, third and fourth terminal electrodes include a fired electrode layer and plating layers on top of the fired electrode layer.

16. The ceramic electronic component according to claim 9, wherein the first and second terminal electrodes are signal terminal electrodes and the third and fourth terminal electrodes are grounding terminal electrodes.

* * * * *